March 17, 1959  G. FEHER  2,878,444
METHOD FOR MEASURING MAGNETIC SUSCEPTIBILITIES
Filed Feb. 24, 1956  2 Sheets-Sheet 1

INVENTOR.
GEORGE FEHER
BY Lippincott & Smith
ATTORNEYS

March 17, 1959 G. FEHER 2,878,444
METHOD FOR MEASURING MAGNETIC SUSCEPTIBILITIES
Filed Feb. 24, 1956 2 Sheets-Sheet 2

INVENTOR.
GEORGE FEHER
BY
*Lippincott & Smith*
ATTORNEYS

United States Patent Office 2,878,444
Patented Mar. 17, 1959

2,878,444

METHOD FOR MEASURING MAGNETIC SUSCEPTIBILITIES

George Feher, Berkeley Heights, N. J., assignor to The Regents of the University of California, Berkeley, Calif., a corporation of California Application February 24, 1956, Serial No. 567,619

7 Claims. (Cl. 324—.5)

This invention relates to improved methods for measuring susceptibility.

Various prior methods for measuring susceptibility are described, for example, in chap. 3 of the book "Modern Magnetism" by L. F. Bates, 3rd ed., Cambridge University Press, 1951. Most of these prior methods involve measurements of force, and require the use of sensitive balances. An object of this invention is to provide improved methods for measuring susceptibility, not involving measurements of force, which may be performed with widely available nuclear magnetic resonance equipment.

In accordance with the present invention, susceptibility is measured by using nuclear resonance absorption phenomena as a probe to explore the internal magnetic fields inside a sample. More specifically, regions having different demagnetizing factors are established within the sample so that, when the sample is placed in a magnetic field, the internal fields within these regions differ in intensity by an amount related to the susceptibility of the sample. For example, two small elongated capsules may be imbedded in the sample to form therein two needle-shaped cavities, one of which is oriented parallel to the applied magnetic field and the other of which is oriented transverse to the applied field. Since the demagnetizing factor of such a cavity is a function of the shape and orientation of the cavity relative to the applied field, the internal magnetic fields within the two capsules differ in intensity by an amount that is a function of the magnetic susceptibility of the sample. The capsules are filled with a material having suitable nuclear resonance properties (water, for example) so that the internal fields within the cavities can be measured by means of nuclear resonance absorption. From these measurements, the magnetic susceptibility of the sample can be computed.

The invention will be better understood from the following detailed description taken in connection with the accompanying drawings, and its scope will be pointed out in the appended claims. In the drawings:

Figure 1:
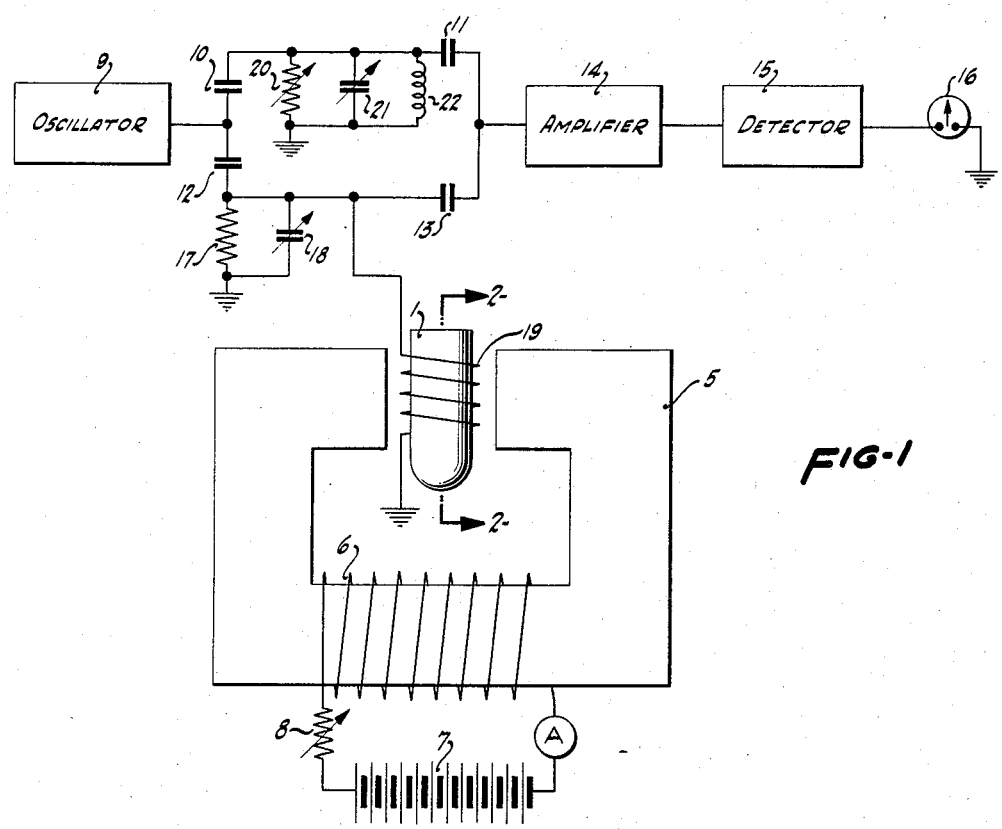
Fig. 1 is a simplified schematic illustration of an apparatus set-up suitable for carrying out methods of this invention.
Figures 2, 3:
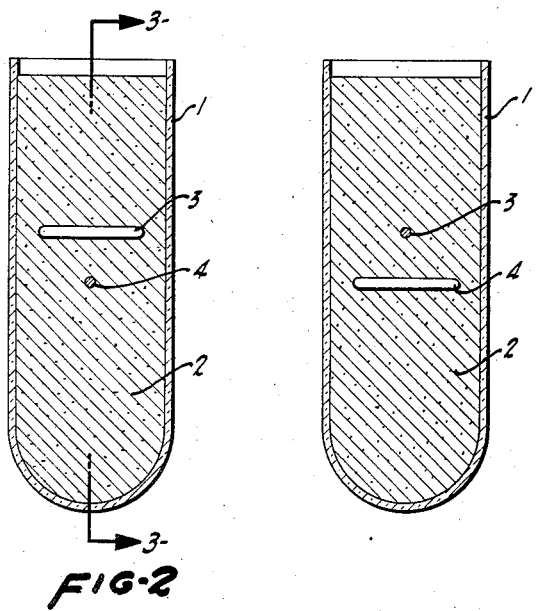
Fig. 2 is an enlarged section taken along the line 2—2 of Fig. 1.
Fig. 3 is a section taken along the line 3—3 of Fig. 2.

Referring now to Figs. 1, 2 and 3 of the drawings, assume that it is desired to measure the susceptibility of manganese sesquioxide ($Mn_2O_3$). An easy-to-handle sample of this material may be made by filling an ordinary test tube 1 with powdered manganese sesquioxide 2. Two capsules 3 and 4 are imbedded in the sample near its center, as shown. Each capsule may be a small glass capillary (about 18 millimeters long and 1.5 millimeters outside diameter, for example) filled with water. The two capsules form crossed elongated cavities within the sample of manganese sesquioxide.

The test tube 1 containing the sample 2 of manganese sesquioxide is placed in a conventional nuclear resonance apparatus, a greatly simplified form of which is illustrated in Fig. 1. The nuclear resonance apparatus includes a magnet structure 5 having a coil 6 that is supplied with electric current by suitable means such as the circuit containing battery 7 and adjustable resistor 8. The amount of current can be adjusted by adjusting resistor 8, and its value can be indicated by an ammeter connected in the circuit as shown. Test tube 1 is placed within an air gap of magnetic structure 5, as shown, so that an unidirectional magnetic field is provided through sample 2. The unidirectional magnetic field intensity can be adjusted by adjusting resistor 8. Elongated capsule 4 is oriented parallel to the applied unidirectional magnetic field, and elongated capsule 3 is oriented transverse to the field. Because of this difference in orientation, the demagnetizing factors of the two capsules are different; and consequently, the unidirectional internal magnetic fields within the capsules have different intensities.

An oscillator 9 supplies an alternating electric signal to the input terminal of a bridge circuit comprising capacitors 10, 11, 12 and 13. The output terminal of the bridge is connected through an amplifier 14 and a detector 15 to an indicating or recording device, represented in the drawing by meter 16. One branch of the bridge circuit is connected to a resistor 17, a capacitor 18, and a coil 19 disposed around and coaxial with test tube 1, as shown. Coil 19 provides in sample 2 an alternating magnetic field transverse to the unidirectional field across the magnet gap. The frequency of this alternating field is the same as the operating frequency of oscillator 9; and it can be adjusted by tuning the oscillator. The frequency may, for example, be in the order of 22.3 megacycles per second. Another circuit branch of the bridge is connected to a resistor 20, a capacitor 21 and an inductor 22, that act as a dummy load for balancing the bridge.

As is well known to those familiar with nuclear resonance apparatus, when the frequency of the alternating field is properly related to the unidirectional internal magnetic field within either of the capsules 3 and 4, proton nuclear magnetic resonance is produced in the water within the capsules, and energy is absorbed from the alternating magnetic field. With respect to the bridge circuit, this energy absorption is equivalent to a change in the electrical resistance of coil 19, which has an effect upon the balance of the bridge circuit and consequently upon the amplitude of the electric signal supplied to amplifier 14.

The bridge circuit is usually adjusted to an approximately balanced condition, or so that meter 16 displays a convenient reference indication. Then oscillator 9 may be tuned to vary the frequency of the alternating magnetic field provided by coil 19, or resistor 8 may be adjusted to vary the intensity of the unidirectional field provided across the gap of magnet structure 5, or both, for progressively changing the ratio of the frequency to the unidirectional magnetic field intensity. In more elaborate nuclear resonance apparatus, these changes may be made automatically and repetitively at a frequency in the order of 30 cycles per second, and the relative absorption as a function of frequency or field intensity may be displayed on an oscilloscope or recorded on a chart.

For example, assume that the magnetic field intensity remains constant and that the frequency is varied progressively by tuning oscillator 9. At frequencies where magnetic resonance absorption occurs, the balance of the bridge circuit changes slightly and this change is indicated by a change in the reading of meter 16. More elaborate nuclear resonance apparatus, sold commercially by Varian Associates, Palo Alto, California, can be used to provide an automatic chart recording that shows the nuclear resonance absorption frequencies.

It is now appropriate to consider quantitatively the unidirectional magnetic field intensities within capsules 3 and 4. Let $H_S$ represent the unidirectional magnetic field intensity inside sample 2, $H_1$ represent the unidirectional magnetic field intensity within capsule 3, $H_2$ represent the unidirectional magnetic field intensity within capsure 4, $N_1$ represent the demagnetizing factor of capsule 3, $N_2$ represent the demagnetizing factor of capsule 4, $\chi$ represent the specific susceptibility of sample 2, $\chi'$ represent the specific susceptibility of the capsules, $\rho$ represent the density of sample 2, and $\rho'$ represent the density of the capsules. The internal magnetic field intensities within the capsules are given by the equations:

$$H_1 = H_S[1 - N_1(\chi'\rho' - \chi\rho)]$$
$$H_2 = H_S[1 - N_2(\chi'\rho' - \chi\rho)]$$

The demagnetizing factors $N_1$ and $N_2$ depend upon the shapes and orientations of the cavities. Since the capsules are elongated bodies having different orientations in the unidirectional magnetic field, their demagnetizing factors are different, and therefore the internal magnetic fields within the two cavities are somewhat different. For example, for a long needle-shaped cavity oriented parallel to an applied field, N is equal to zero; and for a similar cavity oriented perpendicular to the applied field, N is equal to $2\pi$. In actual practice, capsules 3 and 4 are not strictly needle-shaped, and slight corrections in the values of $N_1$ and $N_2$ must be made to take into account the true shape of the capsules and the effect of the capsule walls. As will appear hereinafter, the difference value $N_2 - N_1$ is the important factor, and this difference value can be determined either by calculation or by experiment.

Because the demagnetizing factors of the two cavities are different, the internal magnetic fields within the two cavities are different. If the magnetic intensities remain constant while oscillator 9 is tuned through a range of frequencies, nuclear resonance absorption will be observed at two frequencies $f_1$ and $f_2$ that are proportional to $H_1$ and $H_2$. Since frequency can easily be measured with great precision, nuclear resonance phenomena provide convenient and highly accurate means for determining the relative values of $H_1$ and $H_2$.

Now let $$\Delta H = H_1 - H_2$$
$$H = \tfrac{1}{2}(H_1 + H_2)$$

It will be found that H is much greater than $\Delta H$. From the equations given hereinbefore, the following approximate relation can be derived:

$$\chi'\rho' - \chi\rho = \frac{\Delta H}{H(N_2 - N_1)}$$

Since the frequencies at which nuclear resonance absorption is observed are proportional to the internal magnetic field intensities, frequency values can be substituted for magnetic field intensity values to obtain the relation $$\chi'\rho' - \chi\rho = \frac{\Delta f}{f(N_2 - N_1)}$$

where $$\Delta f = f_1 - f_2$$
$$f = \tfrac{1}{2}(f_1 + f_2)$$

$\Delta f$ and $f$ can be obtained from the frequency measurements hereinbefore explained. If the value of $N_2 - N_1$, $\chi'$, $\rho'$ and $\rho$ are known, it is a simple matter to calculate the value of $\chi$, which is the specific susceptibility of the manganese sesquioxide sample.

Likewise, if the value of $\chi$ is known but the value of $\chi'$ is unknown, the value of $\chi'$ can be calculated. Consequently, the method herein described can also be employed to determine the magnetic susceptibility of materials that exhibit magnetic resonance absorption, in which case it is only necessary to place within the nuclear resonance apparatus two samples having different demagnetizing factors.

Instead of holding the intensity of the applied unidirectional magnetic field constant while the frequency is varied by tuning oscillator 9, the frequency can be held constant while the unidirectional magnetic field intensity is varied (by adjusting resistor 8, for example). Nuclear resonance absorption will then be observed at two magnetic field intensities having a difference value $\Delta H$ and an average value H. Susceptibility can then be computed by substituting the values of $\Delta H/H$ in the mathematical relations hereinbefore set forth.

The value of $N_2 - N_1$ can be calculated for cavities of known simple shapes. However, it is generally easier to determine this value experimentally. This can be done by using the same capsules 3 and 4 in several samples of known susceptibility, measuring the nuclear resonant frequencies, and calculating the value of $N_2 - N_1$ from the mathematical relations herein given. When this is done, irregularities in the shapes of the capsules and the effects of the glass capsule walls are automatically taken into account without the necessity for elaborate calculations and corrections.

If the susceptibility of the sample is the same in all directions, a single capsule, such as capsule 3, may be imbedded in the sample, and the second capsule 4 may be omitted. In this case two measurements are made, and the sample is rotated 90 degrees between the two measurements. For example, for the first measurement the capsule may be oriented parallel to the unidirectional magnetic field, and the nuclear resonant frequency for this orientation is determined. Then the sample is rotated by ninety degrees to orient the capsule perpendicular to the field, and the second nuclear resonant frequency is noted. From these two frequencies the susceptibility of the sample can be computed in the manner hereinbefore explained.

The methods hereinbefore described are appropriate if the difference between the two nuclear resonant frequencies is large compared to the nuclear resonance line width. In other words, the apparatus must be capable of resolving the two absorption lines so that the frequency difference can be determined accurately. However, with some materials it may be found that the width of the absorption lines, in combination with limitations in the resolving power of the nuclear resonance apparatus, is so great relative to the difference between the two resonant frequencies that only a single absorption band is observed. In this case the apparatus shown in Fig. 4 may be utilized advantageously.

Figure 4:
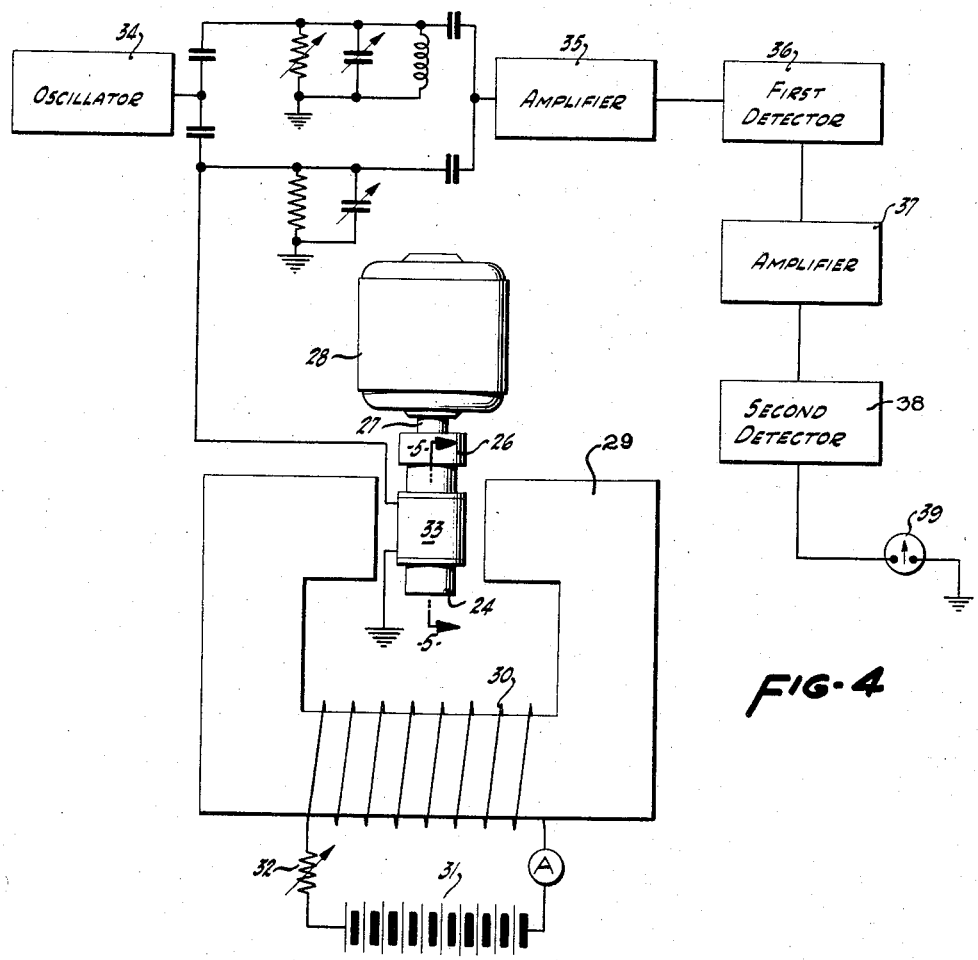
Fig. 4 is a simplified schematic illustration of another apparatus set-up suitable for performing methods of this invention.
Figure 5:
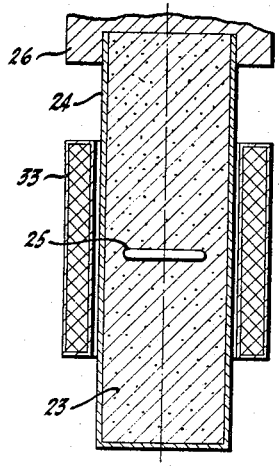
Fig. 5 is a section taken along the line 5—5 of Fig. 4.

Referring now to Figs. 4 and 5, a sample 23 of unknown susceptibility is placed in a hollow cylindrical container 24. An elongated capsule 25, imbedded in the sample as shown, contains a material (such as water) that exhibits nuclear magnetic resonance phenomena. Container 24 is held by a chuck 26 attached to the shaft 27 of a small motor 28, so that motor 28 continuously rotates the sample.

A nuclear resonance apparatus has a magnet structure 29 with a coil 30 that is supplied with electric current by suitable means such as battery 31 and resistor 32. The sample rotates in an air gap of the magnet structure across which there is provided a unidirectional magnetic field. As the sample rotates, capsule 25 rotates through positions respectively oriented parallel and transverse to the unidirectional magnetic field. A coil 33 is disposed around and coaxial with sample 23, as shown. Coil 33 is connected to a bridge circuit that is supplied with an alternating electric signal by oscillator 34. Consequently, coil 33 provides in the sample an alternating magnetic field transverse to the unidirectional magnetic field. The output terminal of the bridge circuit is connected to an amplifier 35, a first detector 36, an amplifier 37, a second detector 38, and an indicating or recording device 39.

The unidirectional magnetic field intensity is adjusted by adjusting resistor 32, or the frequency of the alternating magnetic field is adjusted by tuning oscillator 34, or both, until magnetic resonance absorption occurs within capsule 25. As the sample rotates, the demagnetizing factor of capsule 25 varies periodically as the orientation of the capsule changes with respect to the unidirectional magnetic field.

Accordingly, $$H_C = H + \tfrac{1}{2} \Delta H \sin 2\omega t$$

where $H_C$ represents the instantaneous value of the internal magnetic field intensity within capsule 25, H and $\Delta H$ represent respectively the average value of $H_C$ and the peak-to-peak amplitude variations in $H_C$, and $\omega$ represents the angular velocity of the sample, and $t$ represents instantaneous values of time. The equation $$\chi' \rho' - \chi \rho = \frac{\Delta H}{H(N_2 - N_1)}$$

still holds true, wherein $N_1$ now represents the demagnetizing factor of capsule 25 when it is oriented transverse to the magnetic field, and $N_2$ now represents the demagnetizing factor of capsule 25 when it is oriented parallel to the magnetic field.

The center frequency of the magnetic resonance absorption line at any instant is proportional to $H_C$. The amount of energy absorbed is an inverse function of the difference between the center frequency and the oscillator frequency. Consequently, as sample 23 rotates the amount of energy absorbed varies periodically, and the amplitude of such variation is a function of $$\frac{\Delta H}{H}$$

Thus, the balance of the bridge circuit varies periodically, the amplifier 35 supplies to first detector 36 an amplitude-modulated alternating electric signal, and the first detector 36 supplies to amplifier 37 an alternating electric signal having an amplitude that is a function of $\chi' \rho' - \chi \rho$. This last-mentioned alternating electric signal is rectified by second detector 38, and device 39 provides an indication that is a function of the value of $\chi' \rho' - \chi \rho$. Consequently, the apparatus can be calibrated by experiment or calculation, usually by experiment, to provide indications from which the value of $\chi$ can be read or computed.

Although capsules using water may be used as the bodies within which nuclear resonance phenomenon takes place, the invention is not limited to such capsules. For low-temperature work in particular, it may be advantageous to use other materials that exhibit nuclear resonance phenomena. Furthermore, many variations are possible in the nuclear resonance apparatus, and the use of more elaborate nuclear resonance apparatus than that herein described will generally prove advantageous. Good results have been attained with a Pound nuclear spectrometer of the type described in an article by Pound and Knight, Review of Scientific Instruments, vol. 21, page 219 ff, (1950).

It should be understood that this invention in its broader aspects is not limited to specific illustrative examples herein described, and that the following claims are intended to cover all changes and modifications that do not depart from the true spirit and scope of the invention.

What is claimed is:

1. The method for measuring the susceptibility of a sample, that comprises the steps of imbedding in said sample two bodies of material having nuclear magnetic resonance properties, placing said sample in an unidirectional magnetic field with said two bodies so oriented that their demagnetizing factors are different, providing an alternating magnetic field transverse to said unidirectional field, and varying the relation between the frequency of said alternating field and the strength of said unidirectional field to produce nuclear magnetic resonance within each of said bodies for measuring the difference between the internal magnetic fields therein.

2. The method for measuring the susceptibility of a sample, that comprises the steps of imbedding in said sample two elongated bodies in crossed relation, said bodies containing material having nuclear magnetic resonance properties, providing an unidirectional magnetic field through said sample in a direction parallel to one of said bodies and transverse to the other of said bodies, providing in said sample an alternating magnetic field transverse to said unidirectional field, progressively varying the frequency of said alternating field to produce nuclear magnetic resonance absorption in each of said bodies successively, measuring the energy absorption from said alternating field to determine the nuclear magnetic resonant frequencies of said bodies, and measuring the ratio of the difference between said resonant frequencies and the average of said resonance frequencies.

3. The method as defined in claim 2, in which each of said elongated bodies is a hollow capsule filled with water.

4. The method for measuring the susceptibility of a sample, that comprises the steps of imbedding in said sample two elongated bodies in crossed relation, said bodies containing material having nuclear magnetic resonance properties, providing an unidirectional magnetic field through said sample in a direction parallel to one of said bodies and transverse to the other of said bodies, providing in said sample an alternating magnetic field transverse to said unidirectional field, progressively varying the intensity of said unidirectional field to produce nuclear magnetic resonance absorption in each of said bodies successively, measuring the energy absorption from said alternating fields to determine the relative field intensity values at which nuclear magnetic resonance absorption occurs in said bodies, and measuring the ratio of the difference between said field intensity values and the average of said intensity values.

5. The method as defined in claim 4, in which each of said elongated bodies is a hollow capsule filled with water.

6. The method for measuring the susceptibility of a sample, that comprises the steps of imbedding in said sample an elongated body containing material having nuclear magnetic resonance properties, providing an unidirectional magnetic field through said sample, providing in said sample an alternating magnetic field transverse to said unidirectional field, orienting said body parallel to said unidirectional field, determining the relation between the intensity of said unidirectional field and the frequency of said alternating field at which nuclear magnetic resonance absorption occurs in said body, orienting said body transverse to said unidirectional field, and making a second determination of the relation between the intensity of said unidirectional field and the frequency of said alternating field at which nuclear magnetic resonance absorption occurs in said body.

7. The method for measuring the susceptibility of a sample, that comprises the steps of imbedding in said sample an elongated body containing material having nuclear magnetic resonance properties, providing an unidirectional magnetic field through said sample, providing in said sample an alternating magnetic field transverse to said unidirectional field, adjusting the relation between the frequency of said alternating field and the intensity of said unidirectional field to produce nuclear magnetic resonance absorption in said body, rotating said sample to vary periodically the orientation of said body relative to said unidirectional field, deriving an alternating electric signal having instantaneous values related to the instantaneous nuclear magnetic resonance energy absorption in said body, and measuring the amplitude of said alternating signal.

References Cited in the file of this patent

Klein et al.: Bulletin of the American Physical Society, vol. 29, No. 8, Dec. 28, 1954, page 17. (Received Dec. 8, 1954, by the National Bureau of Standards Library.)